US008064377B2

(12) United States Patent
Yi et al.

(10) Patent No.: US 8,064,377 B2
(45) Date of Patent: Nov. 22, 2011

(54) METHOD FOR ENHANCEMENT OF MULTICASTING FORWARDING PROTOCOL IN A WIRELESS NETWORK

(75) Inventors: Yunjung Yi, St. Louis, MO (US); John J. Shackleton, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 786 days.

(21) Appl. No.: 12/018,956

(22) Filed: Jan. 24, 2008

(65) Prior Publication Data

US 2009/0190514 A1     Jul. 30, 2009

(51) Int. Cl.
  *H04H 1/00*  (2006.01)
  *H04L 12/26*  (2006.01)
  *H04B 7/216*  (2006.01)
(52) U.S. Cl. ......... 370/312; 370/252; 370/256; 370/335
(58) Field of Classification Search .......... 370/312–315, 370/238–402
See application file for complete search history.

(56) References Cited

U.S. PATENT DOCUMENTS

| | | | |
|---|---|---|---|
| 5,173,689 A | 12/1992 | Kusano | |
| 6,199,010 B1 | 3/2001 | Richton | |
| 6,741,565 B1 | 5/2004 | Wicklund | |
| 6,804,244 B1 | 10/2004 | Anandakumar | |
| 6,892,131 B2 | 5/2005 | Coffee et al. | |
| 7,006,453 B1 | 2/2006 | Ahmed | |
| 7,190,672 B1 | 3/2007 | Whitehall | |
| 7,796,503 B2 | 9/2010 | Hamada | |
| 7,864,775 B2 | 1/2011 | Shackleton | |
| 2001/0052072 A1 | 12/2001 | Jung | |
| 2002/0067693 A1 | 6/2002 | Kodialam et al. | |

(Continued)

FOREIGN PATENT DOCUMENTS

EP     1134940     9/2001

(Continued)

OTHER PUBLICATIONS

Marina et al., "AD HOC on-Demand Multipath Distance Vector Routing", "Mobile Computing and Communications Review", Jul. 2002, pp. 92-93, vol. 6, No. 3, Publisher: ACM.

(Continued)

*Primary Examiner* — Afsar M. Qureshi
(74) *Attorney, Agent, or Firm* — Fogg & Powers LLP

(57) ABSTRACT

A method for enhancing the reliability of a simplified multicasting forwarding protocol in a wireless network is provided. The method comprises establishing a list of multipoint relaying (MPR) nodes for each of a plurality of nodes. The list of MPR nodes includes neighbor nodes that cover each of the plurality of nodes within two hops. A first set of nodes is identified that is not already in the list of MPR nodes. In a first approach, the first set of nodes includes nodes that are the only neighbor node to a node in the list of MPR nodes. In a second alternative approach, the first set of nodes includes nodes that are sequentially previous to a node in the list of MPR nodes. Once the first set of nodes is identified, the first set of nodes is added to the list of MPR nodes. If the first approach is used, the method further comprises identifying a second set of nodes that is not already in the list of MPR nodes. The second set of nodes comprises nodes that have the largest number of neighboring MPR nodes. The second set of nodes is then added to the list of MPR nodes.

20 Claims, 7 Drawing Sheets

U.S. PATENT DOCUMENTS

| | | | |
|---|---|---|---|
| 2002/0145978 | A1 | 10/2002 | Batsell et al. |
| 2002/0150050 | A1 | 10/2002 | Nathanson |
| 2002/0191584 | A1 | 12/2002 | Korus et al. |
| 2003/0083060 | A1 | 5/2003 | Menendez |
| 2003/0118044 | A1 | 6/2003 | Blanc et al. |
| 2003/0128706 | A1 | 7/2003 | Mark et al. |
| 2003/0174652 | A1 | 9/2003 | Ebata |
| 2004/0174824 | A1 | 9/2004 | Ohta et al. |
| 2004/0258064 | A1 | 12/2004 | Nakamura |
| 2004/0260829 | A1 | 12/2004 | Husak et al. |
| 2005/0054346 | A1 | 3/2005 | Windham et al. |
| 2005/0073958 | A1 | 4/2005 | Atlas et al. |
| 2005/0105469 | A1 | 5/2005 | Hao |
| 2005/0163145 | A1 | 7/2005 | Dombkowski |
| 2005/0174936 | A1 | 8/2005 | Betker |
| 2005/0190767 | A1 | 9/2005 | Lee et al. |
| 2005/0265256 | A1 | 12/2005 | Delaney |
| 2006/0002337 | A1 | 1/2006 | Itoh et al. |
| 2006/0023677 | A1 | 2/2006 | Labrador et al. |
| 2006/0056353 | A1 | 3/2006 | McBride |
| 2006/0098608 | A1 | 5/2006 | Joshi |
| 2006/0109831 | A1 | 5/2006 | Tillotson |
| 2006/0250999 | A1 | 11/2006 | Zeng et al. |
| 2007/0037568 | A1 | 2/2007 | Warner et al. |
| 2007/0043656 | A1 | 2/2007 | Lancaster |
| 2007/0054697 | A1 | 3/2007 | Money et al. |
| 2007/0070983 | A1 | 3/2007 | Redi et al. |
| 2007/0076633 | A1 | 4/2007 | Sin |
| 2007/0121521 | A1 | 5/2007 | D'Amico et al. |
| 2007/0140114 | A1 | 6/2007 | Mosko |
| 2007/0153817 | A1 | 7/2007 | Osann |
| 2007/0286097 | A1 | 12/2007 | Davies |
| 2008/0151793 | A1 | 6/2008 | Wright |
| 2008/0151841 | A1 | 6/2008 | Yi et al. |
| 2008/0151889 | A1 | 6/2008 | Yi et al. |
| 2008/0247335 | A1* | 10/2008 | Rudnick .................... 370/256 |
| 2010/0020740 | A1* | 1/2010 | Watanabe et al. ............ 370/315 |
| 2011/0060828 | A1 | 3/2011 | Shackleton |

FOREIGN PATENT DOCUMENTS

| WO | 2006072850 | 7/2006 |
|---|---|---|

OTHER PUBLICATIONS

"Networking on the Move", "Military & Aerospace Electronics, www.milaero.com", Jun. 2005, p. 32, Publisher: Penn Well Publishing Co.

Nguyen et al., "Maintaining Communication Link for Tacitcal Ground Robots", "AUVSI Unmanned Systems North America 2005", Aug. 2004, pp. 1-13, Publisher: AUVSI.

Studer et al., "Efficient Mechanisms to Provide Convoy Member and Vehicle Sequence Authentication in VANETs", "Proceedings of the International Conference on Security and Privacy in Communication Networks", 2007, pp. 1-11, Publisher: SECURECOMM.

Zhang et al., "Dynamic Proxy Tree-Based Data Dissemination Schemes for Wireless Sensor Networks", "2004 IEEE International Conference on Mobile AD-HOC and Sensor Systems", Oct. 2004, pp. 21-30, Publisher: IEEE.

Baccelli et al., "OSPF MPR Extension for AD HPC Networks", Feb. 1, 2007, Publisher: IETF Standard Working Draft.

Clausen et al., "Optimized Link State Routing Protocol (OLSR)", Oct. 1, 2003, Publisher: IETF Standard, Internet Engineering Task Force.

Clausen et al., "The Optimized Link State Routing Protocol Version 2", Jul. 9, 2007, Publisher: IETF Standard-Working-Draft.

European Patent Office, "European Search Report", Aug. 6, 2009, Published in: EP.

Jacquet et al., "Optimized Link State Routing Protocol for AD HOC Networks", "Multi Topic Conference, 2001. IEEE INMIC 2001. Technology for the 21st Century Proceedings.", Dec. 28-30, 2001, pp. 62-68, Publisher: IEEE International, Published in: Piscataway, NJ, USA.

Basagni et al., "A Distance Routing Effect Algorithm for Mobility (Dream)" "Proceedings of the 4th Annual ACM/IEEE International Conference on Mobile Computing and Networking", 10/1998, pp. 76-84, Publisher: MOBICOM, Published in: New York US.

Camara et al., "A Novel Routing Algorithm for Ad Hoc Networks", "Proceedings of the Annual Hawaii International Conference on System Sciences", 2000, pp. 18, vol. 2, Published in: Hawaii US.

Jain et al., "Geographical Routing Using Partial Information for Wireless Ad Hoc Networks", "IEEE Personal Communications", Feb. 2001, pp. 4857, vol. 8, No. 1, Publisher: IEEE Communications Society, Published in: US.

Lin X et al., "Location-Based Localized Alternate, Disjoint and Multi-Path Routing Algorithms for Wireless Networks", "Journal of Parallel and Distributed Computing", Jan. 2003, pp. 2232, vol. 63, No. 1, Publisher: Elsevier, Published in: Amsterdam Nl.

Little, T. et al., "An Information Propagation Scheme for VANETs", "Intelligent Transporation Systems", Sep. 13, 2005, pp. 155160, Publisher: IEEE.

Tardec, "National Automotive Center Betronics Intelligent Systems Conference Paper IVSS-2005-MAS-01", "Intelligent Vehicle Systems Edition 2005", Jun. 2005, p. 240 Publisher: U.S. Army Tank Automotive Research, Development and Engineering Center, Published in: US.

Wischhof, L. et al, "Congestion Control in Vehicular ad hoc Networks", "Vehicular Electronics and Safety", Oct. 14, 2005, pp. 5863, Publisher: IEEE International Confereone on XI'AN.

* cited by examiner

METHOD FOR ENHANCEMENT OF MULTICASTING FORWARDING PROTOCOL IN A WIRELESS NETWORK

RELATED APPLICATIONS

This application is related to the following applications, all of which are hereby incorporated by reference:

U.S. patent application Ser. No. 11/613,700, filed on Dec. 20, 2006, and entitled "DISTANCE ADAPTIVE ROUTING PROTOCOL;"

U.S. patent application Ser. No. 11/613,730, filed on Dec. 20, 2006, and entitled "CONFIGURATION AWARE PACKET ROUTING IN AN AD-HOC NETWORK;" and U.S. patent application Ser. No. 11/613,749, filed on Dec. 20, 2006, and entitled "VOICE-OVER-INTERNET PROTOCOL INTRA-VEHICLE COMMUNICATIONS."

BACKGROUND

In any convoy of utility vehicles or other applications wherein a group of vehicles are in close proximity, intra-convoy voice communications and the ability to efficiently transfer data among the vehicles are imperative for safe and efficient operations. This is especially true during operation of convoys of military utility vehicles. One method of real-time, direct voice intra-convoy communications is via individual communication devices, such as walkie-talkies, used within the convoy. Other more advanced concepts may incorporate satellite communications from one or more vehicles within the convoy. Such satellite communications can be hampered by the number of satellite-equipped vehicles, and usually is restricted to satellite text message systems. Furthermore, since the signal must be bounced off a satellite orbiting the earth, there is an inherent delay in the text message communications. This time delay could prove critical to safe convoy operations.

One of the factors that inhibit communication systems in convoys is the lack of a fixed infrastructure of nodes and antennas in the areas where convoys operate. Attempts have been made to overcome this problem by establishing communication via mobile ad-hoc networks (MANET). A MANET includes a number of geographically-distributed, potentially mobile nodes sharing one or more common radio channels. MANETs differ from other networks (e.g. Internet, wireless LAN), because a MANET lacks a fixed infrastructure. Instead of having centralized routers/servers and local access points, the network consists of only nodes and each node behaves as a router and forwards packets through the network. A MANET can be created and adjusted on the fly as the nodes enter and exit the network. MANETs are more difficult to administer than a fixed infrastructure network, but there are many situations in which a fixed infrastructure network is impractical or unavailable, for example, after a natural disaster.

MANETs pose many challenges to current designers. Due to the lack of a central controller and processor, all functions must be distributed amongst the nodes. As a result, all nodes are essentially the same in their construction. Additionally, in a wireless setting the distance between two nodes may be greater than the radio transmission range of the nodes. This forces information to be hopped through other nodes to get to the destination node. As the network grows in size, routing the information through the nodes becomes more complex. As a result, much effort has been put into the design of routing protocols. The routing protocol for a network can greatly affect the speed and quality of a MANETs service. Routing protocols must adapt to the frequent changes in the network, and often must do so with information that is not current with network activities. Further, gathering new information about the network puts a strain on network resources and may not update frequently enough to be effective.

One of the greatest difficulties confronting ad hoc wireless networks is route recovery after a route breakage occurs. Often breakages are the result of two nodes on a route losing communication with each other. Loss of communication can result from one of the nodes leaving the network, or when the distance between nodes becomes longer than the transmission range of the nodes. Physical barriers, interference, and other natural phenomena can also interrupt the communication path. Two opposing protocol designs have been developed to improve route recovery, one proactive and one reactive.

The proactive protocols require each node to maintain a current routing table with routes to every other node in the network regardless of whether any data transmission will occur with the other nodes. Proactive routing protocols have a short latency for discovery of a route, because a source node already has the route to a destination node in its routing table. Maintaining a current routing table, however, causes proactive protocols to use a considerable amount of network resources. Nodes are continually sending packets around the network as they verify routes to ensure their routing tables are up to date. Exemplary proactive protocols are Open Storage Path First (OSPF), Optimal Link State Routing (OLSR), and Topology Broadcast based on Reverse-Path Forwarding (TBRPF).

Reactive protocols require a node to maintain information only on current or recently used routes in which the node itself is involved. Under these protocols, a source node initiates route discovery only when the source node needs to send packets to a destination that is not on a current route the source node is using. Thus, network resources are not unnecessarily tied up discovering routes that may never be used. The route discovery process, however, will incur a large latency during startup of the route because a new route must be discovered before data can be sent. Reactive protocols generally show better bandwidth efficiency than proactive routing if there are a small number of source-destination pairs. Exemplary reactive protocols are Ad hoc On-demand Multi-path Distance Vector (AOMDV) and Dynamic Source Routing (DSR).

SUMMARY

The present invention relates to a method for enhancing the reliability of a simplified multicasting forwarding protocol in a wireless network. The method comprises establishing a list of multi-point relaying (MPR) nodes for each of a plurality of nodes in the wireless network. The list of MPR nodes includes neighbor nodes that cover each of the plurality of nodes within two hops. A first set of nodes is identified in the wireless network that is not already in the list of MPR nodes. In a first approach, the first set of nodes includes nodes that are the only neighbor node to a node in the list of MPR nodes. In a second alternative approach, the first set of nodes includes nodes that are sequentially previous to a node in the list of MPR nodes. Once the first set of nodes is identified, the first set of nodes is added to the list of MPR nodes.

If the first approach is used, the method further comprises identifying a second set of nodes in the wireless network that is not already in the list of MPR nodes. The second set of nodes comprises nodes that have the largest number of neighboring MPR nodes. The second set of nodes is then added to the list of MPR nodes.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is directed to a method for enhancing the reliability of a multicasting forwarding protocol, such as simplified multicast forwarding, in a wireless network. The present method comprises establishing a list of multi-point relaying (MPR) nodes for each of a plurality of nodes in the wireless network. The list of MPR nodes includes neighbor nodes that cover each of the plurality of nodes within two hops. A first set of nodes are identified in the wireless network that are not already in the list of MPR nodes. In one approach, the first set of nodes includes nodes that are the only neighbor node to a node in the list of MPR nodes. In another approach, the first set of nodes includes nodes that are sequentially previous to a node in the list of MPR nodes. Once the first set of nodes is identified, the first set of nodes is added to the list of MPR nodes.

When the first set of nodes includes nodes that are the only neighbor node to a node in the list of MPR nodes, the present method further comprises identifying a second set of nodes in the wireless network that are not already in the list of MPR nodes, and that are neighbors to the most number of nodes in the list of MPR nodes. The second set of nodes is then added to the list of MPR nodes. The first and second sets of nodes can be added to the list of MPR nodes by an Optimal Link State Routing (OLSR) selection mechanism.

The present method improves the average delivery ratio for packets in the wireless network such as a mobile ad hoc network, and reduces the amount of packets that are dropped due to node mobility, interference, or multipath. The method can be used for improving end-to-end reliability in convoy Voice over Internet Protocol (VoIP) conferencing, or in air-to-air communications. The present method also improves coverage of the MPR nodes by adding more forwarding nodes, and provides resiliency against mobility as the added MPR nodes will bridge among the original MPR nodes.

The present invention is described in further detail in the following sections.

Mobile Ad Hoc Networks

Figure 1:
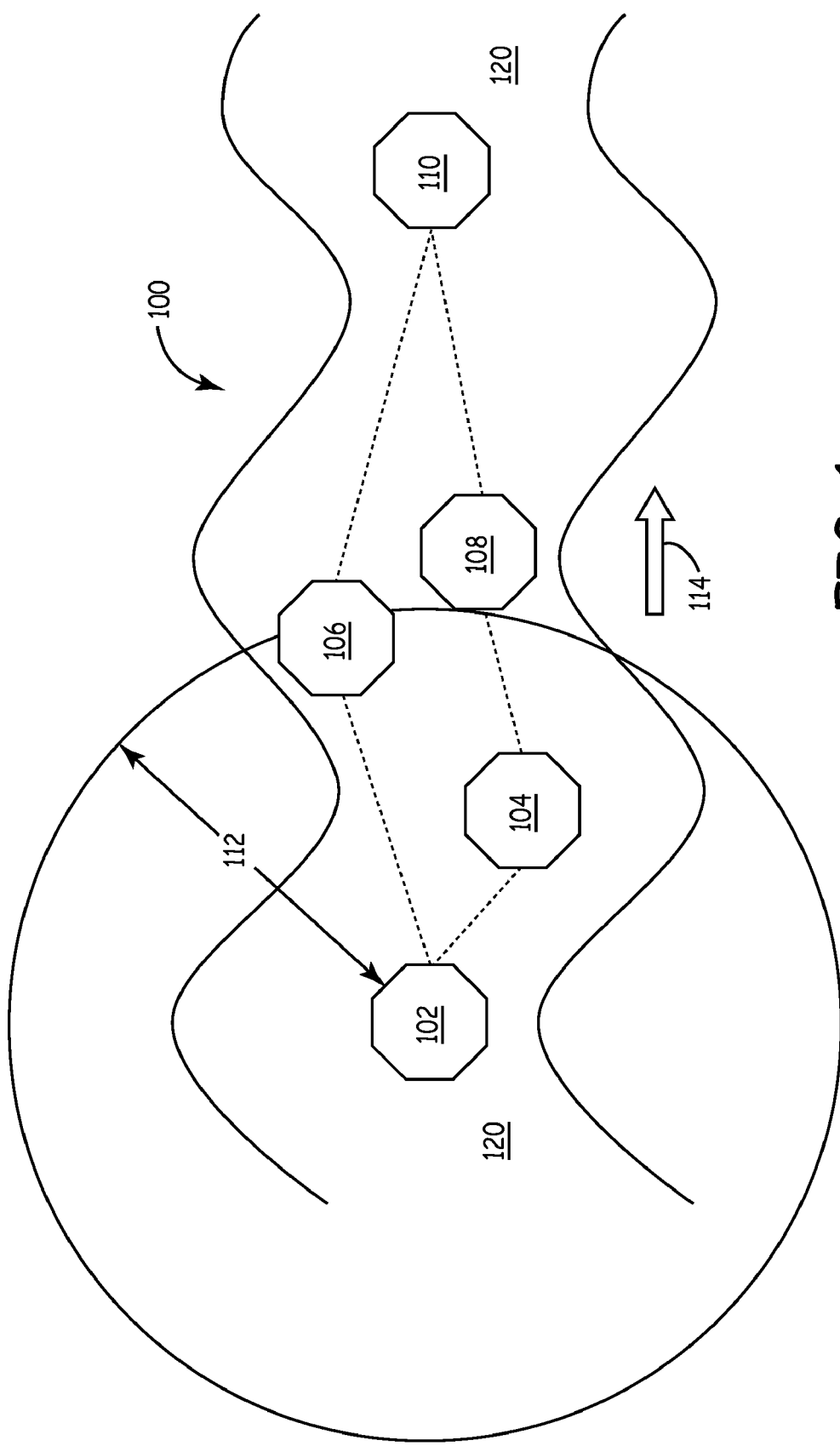
FIG. 1 is a schematic view of one embodiment of nodes in a mobile ad-hoc network.

FIG. 1 illustrates one embodiment of a mobile ad hoc wireless network 100 that includes a plurality of nodes 102, 104, 106, 108, and 110. While network 100 is shown with five nodes, any number of nodes sufficient to establish a network can be employed. In one embodiment, each of the nodes in wireless network 100 is a wireless hub on a separate vehicle of a convoy.

Each of the nodes of wireless network 100 can initiate and run an Internet Protocol (IP) layer forming a wireless local area network (WLAN). The nodes are each given a unique host ID to enable specific addressing by an IP address. Each node can then send a packet over the network and address the packet to the destination IP address.

The nodes shown in FIG. 1 can be located in vehicles traveling in the same general direction 114 down a road 120. For example, the vehicles could be a military convoy, police squadron, or even civilian commuters. Vehicles such as these often travel by a similar path and at a similar rate of speed. Thus, nodes 102, 104, 106, 108, and 110 form a semi-static, substantially linear configuration where the relative relationship among the nodes does not change instantaneously or drastically. Additionally, the configuration of mission performing vehicles is often known prior to establishing the network.

Although each of the nodes in wireless network 100 has the capability of communicating with all other nodes, each of the nodes is constrained in their communication abilities by the physical limitations of their radio transmitters and receivers. Any node beyond the transmission range of the radio transmitter of another node is out of direct communication with that node. For example, node 102 has a transmission range 112 which is shorter than the distance to node 108. As a result, node 102 cannot directly send a packet to node 110. When node 102 has a packet to send to node 110, node 102 relays the packet through intermediate nodes 104 or 106 making multiple shorter distance transmissions.

Simplified Multicast Forwarding

The IP multicasting protocol known as Simplified Multicast Forwarding (SMF) is used in mobile ad hoc networks (MANETs) to forward packets, and is based on flooding mechanisms. For example, in a blind flooding mechanism, every node in the network rebroadcasts at most once upon receiving a new packet. If the network becomes denser (i.e., more nodes placed in the same size of the field), the forwarding/relaying overhead by blind flooding will be increased. The SMF protocol is based on the unicast routing OLSR protocol.

In the SMF protocol, multicast group information or structure is not maintained. Receivers (i.e., members) in the network will be reached from the source by forwarding through MPR nodes in the network, where MPR nodes can cover the whole network with lower forwarding overhead. While only the MPR nodes can rebroadcast the packets, this is optional. Blind flooding or other efficient flooding mechanism can also be applied. The conventional MPR selection algorithm chooses a minimum number of nodes as forwarding nodes, which will cover the entire network in a static scenario. Due to link error, node mobility, and interference, the coverage of forwarding nodes may not be complete in a large convoy of mobile vehicles.

The convoy VoIP allows for group communication such as in a convoy of mobile vehicles, and uses the SMF protocol for multicast traffic. The present invention provides a method that maximizes the reliability of the multicasting protocol used in convoy VoIP conferencing, while minimizing extra incurred overhead.

The present method improves upon the MPR selection algorithm to select a sufficient number of forwarding nodes to cover the whole network even in the presence of high mobility and dynamic topology changes. The present approach effectively increases the number of forwarding nodes so that the nodes can cope with packet drops and errors in highly mobile applications such as used in ad hoc networks.

Multi-Point Relaying

Convoy applications can have a fairly high network density where each node can have 7 to 15 neighbors, for example. In such a dense network, blind flooding may not be so efficient due to large and excessive overhead. The SMF protocol offers options to use efficient flooding mechanisms where only dominating nodes will forward a new packet and others will not relay the packet. There are various schemes to select a set of dominating nodes that will select a sub-optimal set covering the whole network. For example, the SMF protocol uses a Multi-Point Relaying (MPR) scheme that is also used in OLSR.

The MPR scheme is a heuristic mechanism for choosing sub-optimal dominant forwarding nodes. The problem of choosing the minimal set of dominating nodes is a NP-hard problem and thus many heuristic sub-optimal algorithms have been proposed. The general mechanism of MPR selection is as follows.

1. Every node in the network will propagate the list of its neighbors by piggybacking on the hello messages. The hello messages will be periodically exchanged.
2. Every node, by obtaining information from neighbors, forms a set of two hop neighbors which can be reached within two hops from the node.
3. Every node will calculate the MPR nodes that will cover the set of two hop neighbors.
   a. Begin with an empty MPR set.
   b. Add to the MPR set each neighbor that is the only one covering some two hop neighbor.
   c. Repeat until all two hop neighbors are covered.
      i. Add to the MPR set a neighbor that covers a maximum number of two hop neighbors that are still uncovered by previously selected MPR nodes.
4. Every node set the flag of MPR for each neighbor that belongs in the MPR set. The information will be exchanged through hello messages.
5. Every node upon receiving a hello message creates MPR selector list that includes all the neighbors who select the node as a MPR node.

In efficient flooding with MPR selection, a node will rebroadcast a new packet if the previous hop node (that forwards/sends the packet—it may not be a source node) belongs to the MPR selector list, i.e., the previous hop node has selected this node as a MPR to cover some two hop neighbors. Otherwise, it will not forward the packet.

Each node will choose neighbors as MPR nodes which are at a distance farther from the node, since such MPR nodes will cover more two hop neighbors than nearer nodes. Thus, in the presence of mobility, the links between the node and its MPR nodes can be easily broken, since the distance therebetween is fairly long and thus the small distance change by mobility may lead out of transmission range. The link breakage will be detected only after a few hello message exchange intervals, and before the recovery, the packet will be dropped because of invalid links.

Figure 2:
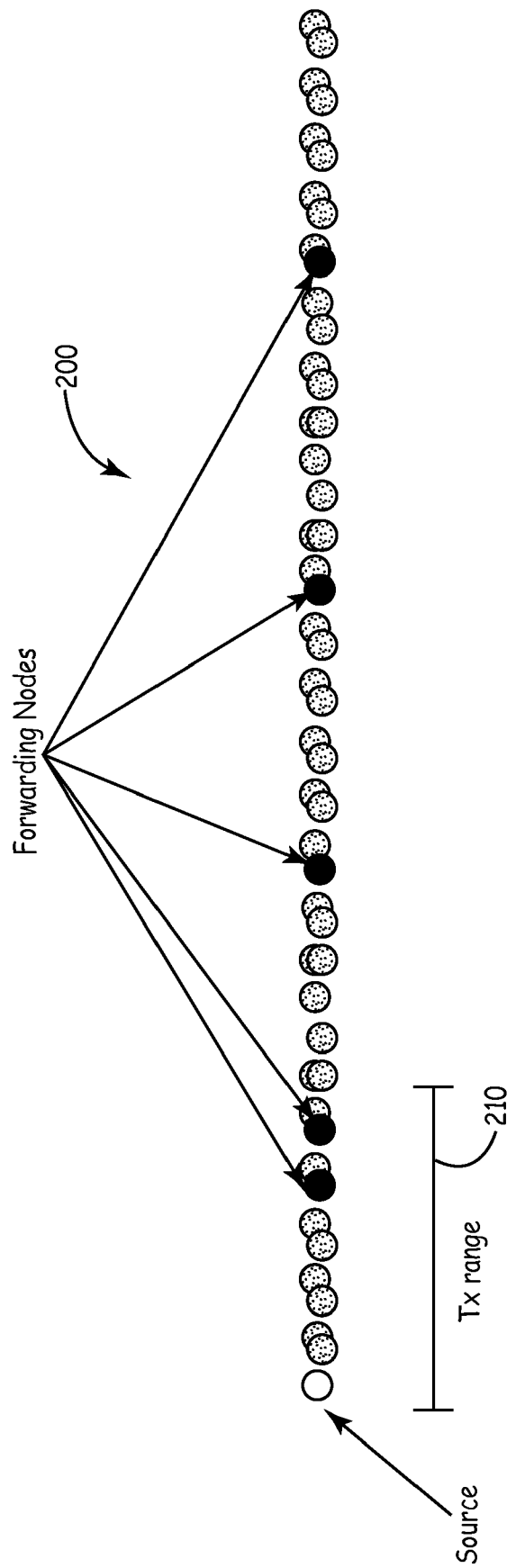
FIG. 2 is a schematic diagram depicting an example of efficient flooding with a multi-point relaying mechanism in a string-like convoy scenario.

FIG. 2 illustrates an example of efficient flooding with a MPR mechanism in a string-like vehicle convoy scenario 200. The distance between forwarding nodes in convoy scenario 200 (i.e., the source or MPR nodes) is close to the radio transmission range 210. Since the speed of each vehicle in the convoy slightly changes as the convoy is moving, the distance among vehicles will vary. Thus, the link between two forwarding nodes may frequently fail and will result in a low data delivery ratio.

Redundant MPR Selection Schemes

In the present method, which provides redundant MPR selection schemes, it is assumed that each vehicle in a convoy may not know its location information. Even if a vehicle knows, due to security reasons, the location information cannot be exchanged among vehicles in the convoy. It is also assumed that signal strength or some other information that can be acquired at the interface of the MAC/PHY (Media Access Control/physical) layers is not available at the SMF protocol. Thus, the change of MPR selection heuristic to choose a better set of MPR nodes may not be so straightforward. For example, if the signal strength is known from a neighbor node, the MPR selection scheme can avoid choosing a node with low signal strength (thus high probability of link failure). The present approach keeps the MPR selection heuristics and chooses a redundant set of MPR nodes so that the set of MPR nodes will cover the whole network even in the presence of high mobility and frequent link breakages.

Figure 3:
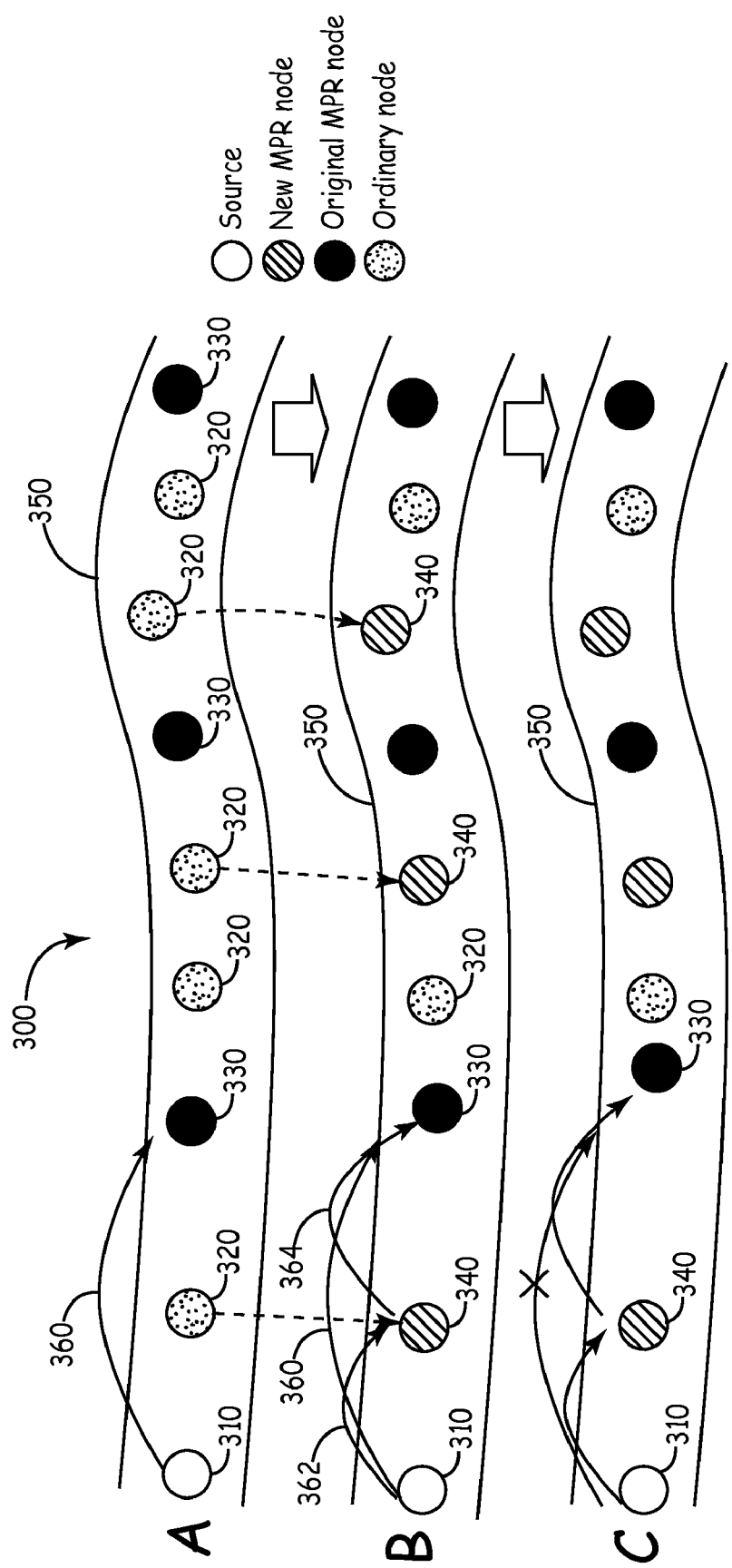
FIG. 3 is a schematic diagram showing use of a redundant multi-point relaying selection scheme in a string-like vehicle convoy scenario.

FIG. 3 illustrates an example of a redundant MPR selection scheme for a string-like vehicle convoy scenario 300, which is illustrated in configurations A, B, and C. The convoy scenario 300 includes a source node 310, ordinary nodes 320, original MPR nodes 330, and new (redundant) MPR nodes 340. The nodes (vehicles) are traveling on a road 350. Initially, original MPR nodes 330 are chosen using a MPR selection heuristic (configuration A). The distance between source node 310 and a first MPR node 330 is close to the radio transmission range 360. The redundant MPR selection scheme then chooses select ordinary nodes 320 to become redundant MPR nodes 340 (configuration B). For example, the first ordinary node 320 ahead of source node 310 (configuration A) is selected to be a redundant MPR node 340 (configuration B), which can receive packets from source node 310 at a transmission range 362 and transmit the packets to a first original MPR node 330 at a transmission range 364. If the speed of the vehicle with first original MPR node 330 increases so that node 330 is out of transmission range from source node 310 (configuration C), redundant MPR node 340 will cover the out of range node 330. Thus, redundant MPR node 340 can be used to transmit packets from source node 310 to original MPR node 330.

Figure 4:
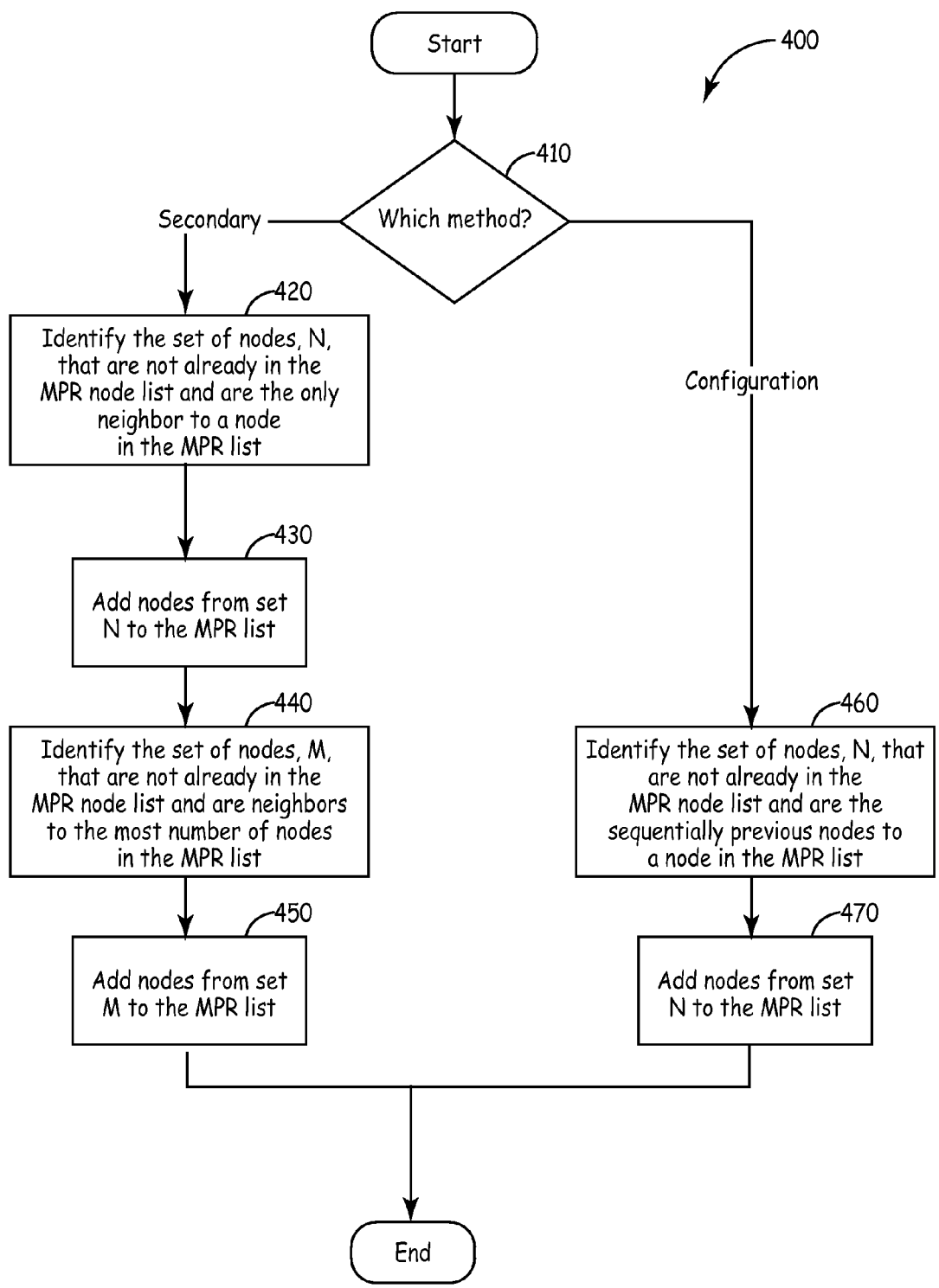
FIG. 4 is a flow diagram for a method of selecting a redundant set of multi-point relaying nodes.

The redundant set of MPR nodes can be selected using two alternative techniques: secondary MPR set calculation (secondary), and configuration-aware MPR selection (configuration). FIG. 4 is a flow diagram of a method 400, which summarizes these two techniques for use in an ad hoc wireless network. Prior to the start of method 400, it is assumed that a list of MPR nodes has been established. This MPR node list is made up of neighbor nodes that cover the nodes within two hops away under ideal conditions (in which no links between nodes are lost).

When the secondary technique is selected at decision block 410, a set of nodes N are identified that are not already in the MPR node list, and that are the only neighbor to a node in the MPR node list (block 420). The nodes from set N are then added to the MPR node list (block 430). Next, a set of nodes M are identified that are not already in the MPR node list, and that are neighbors to the most number of nodes in the MPR node list (block 440). The nodes from set M are then added to the MPR node list (block 450).

When the configuration technique is selected at decision block 410, a set of nodes N in the network are identified that are not already in the MPR node list, and that are the sequentially previous nodes to a node in the MPR node list (block 460). The nodes from set N are then added to the MPR node list (block 470).

Further details of the secondary and configuration techniques are described as follows.

A. Secondary MPR Set Calculation

Figure 5A:
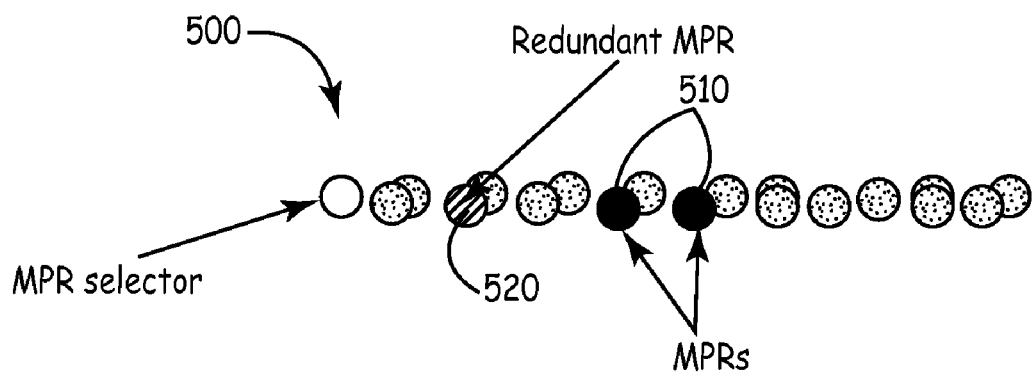
FIG. 5A is a schematic diagram showing use of a multi-point relaying set calculation technique in a string-like convoy scenario.

In the secondary MPR set calculation, once a primary set of MPR nodes is calculated using a MPR selection heuristic, the method selects a secondary set of MPR nodes among neighbors that do not belong to the primary set of MPR nodes, and that covers the primary set of MPR nodes. FIG. 5A illustrates an example of the MPR set calculation technique used in a string-like vehicle convoy scenario 500, in which a primary set of MPR nodes 510 has been previously selected. The secondary MPR set calculation selects a secondary set of redundant MPR nodes such as node 520.

An exemplary pseudo code for the secondary MPR set calculation technique follows.

--- a. Put two hop neighbors to the list N_2;
b. Calculate one hop neighbor set N_1(z) for all nodes z in two hop neighbor lists N_2;
c. Calculate two hop neighbor set N_2(y) for all nodes y in N_1;
d. For each z in N_2 where |N_1(z)| = 1 (i.e., who has only one neighbor), select the node n = N_1(z) and add to the MPR set;
    i. Remove n from N_1;
    ii. For each y in N_2(n), remove y from N_2;
    iii. Calculate N_1(z) for all nodes z in N_2;
    iv. Calculate N_2(y) for all nodes y in N_2;
e. While N_2 is not empty, with the largest |N_2(y)|, add n = y to the MPR set;
    i. Remove n from N_1;
    ii. For each y in N_2(n), remove y from N_2;
    iii. Calculate N_1(z) for all nodes z in N_2;
    iv. Calculate N_2(y) for all nodes y in N_2;
f. /* End of Primary MPR selection */;
g. Put neighbor selected MPRs into the list N_2; and
h. Repeat the steps b to e until N_2 becomes empty /*In other words, the secondary MPRs to cover the previously selected MPRs will be calculated*/.

---

B. Configuration-Aware MPR Selection

In the configuration-aware MPR selection, instead of calculating a secondary MPR set that covers the primary MPR nodes, the configuration information is used to select redundant MPR nodes. For each MPR node, a node that is a previous node of the MPR node in a configuration table (e.g., a vehicle ahead of a MPR vehicle in a convoy) will be selected as a redundant MPR node.

Figure 5B:
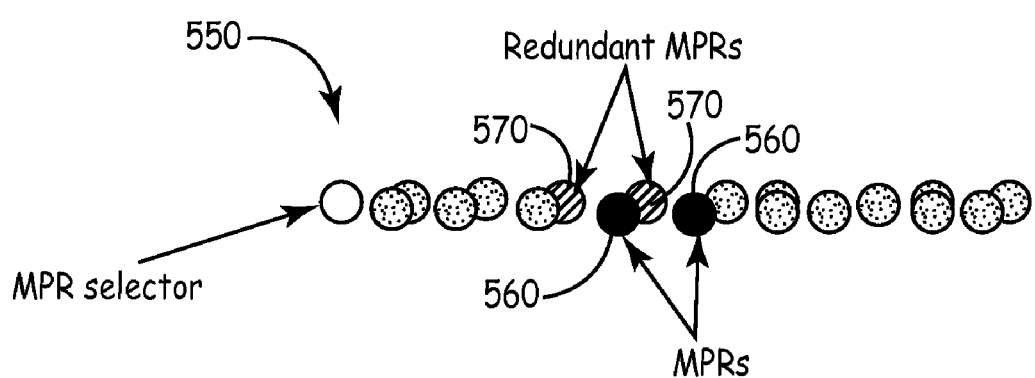
FIG. 5B is a schematic diagram showing use of a configuration-aware multi-point relaying selection technique in a string-like convoy scenario.

FIG. 5B illustrates an example of the configuration-aware MPR selection technique in a string-like vehicle convoy scenario 550, in which a primary set of MPR nodes 560 has been previously selected. The configuration-aware MPR selection technique chooses a secondary set of redundant MPR nodes such as previous nodes 570. If the vehicles in the convoy are moving in order, the distance to previous nodes 570 will likely be shorter from the MPR selector than to MPR nodes 560 from the MPR selector. Thus, the probability of link failure between the MPR selector and previous node 570 of each MPR node 560 is less than that between the MPR selector and each MPR node 560. In utilizing configuration information, however, there is no guarantee that the link between the MPR selector and the previous node of the MPR node will be present.

An exemplary pseudo code for the configuration-aware MPR selection technique follows.

--- a. Put two hop neighbors to the list N_2;
b. Calculate one hop neighbor set N_1(z) for all nodes z in two hop neighbor lists N_2;
c. Calculate two hop neighbor set N_2(y) for all nodes y in N_1;
d. For each z in N_2 where |N_1(z)| = 1 (i.e., who has only one neighbor), select the node n = N_1(z) and add to the MPR set;
    i. Remove n from N_1;
    ii. For each y in N_2(n), remove y from N_2;
    iii. Calculate N_1(z) for all nodes z in N_2;
    iv. Calculate N_2(y) for all nodes y in N_2;
e. While N_2 is not empty, with the largest |N_2(y)|, add n = y to the MPR set;
    i. Remove n from N_1;
    ii. For each y in N_2(n), remove y from N_2;
    iii. Calculate N_1(z) for all nodes z in N_2;
    iv. Calculate N_2(y) for all nodes y in N_2;
f. /* End of Primary MPR selection */; and
g. For each node n in the MPR set, select a node y that is a previous node in the configuration table and add y to the MPR set.

---

Simulation Analysis

A simulation analysis was performed for the secondary MPR set calculation and configuration-aware MPR selection techniques described in the previous section. The simulation analysis was performed using the OPNET Modeler®, which is a network simulator. In the simulation analysis study, 50 nodes (vehicles) were placed in a string-like configuration. The distance between adjacent nodes was about 10 meters on average and the transmission range of each node was approximately 100 meters. The nodes moved with an average speed of about 20 m/s, and the speed of each node was randomly distributed in [10, 30] m/s. For this study, only one node was set as a source and the other nodes in the network just listened.

In obtaining the results, the delivery ratio, packet drop probability, and forwarding overhead were measured. The delivery ratio was defined as the number of receivers that received a packet divided by the total number of receivers (49 in the scenario). The packet drop probability was defined as one minus the delivery ratio. The forwarding overhead was defined as the number of forwarding nodes for a packet divided by the number of received members. The source sent a packet per second (8 Kbits) and all other nodes were members.

Figure 6:
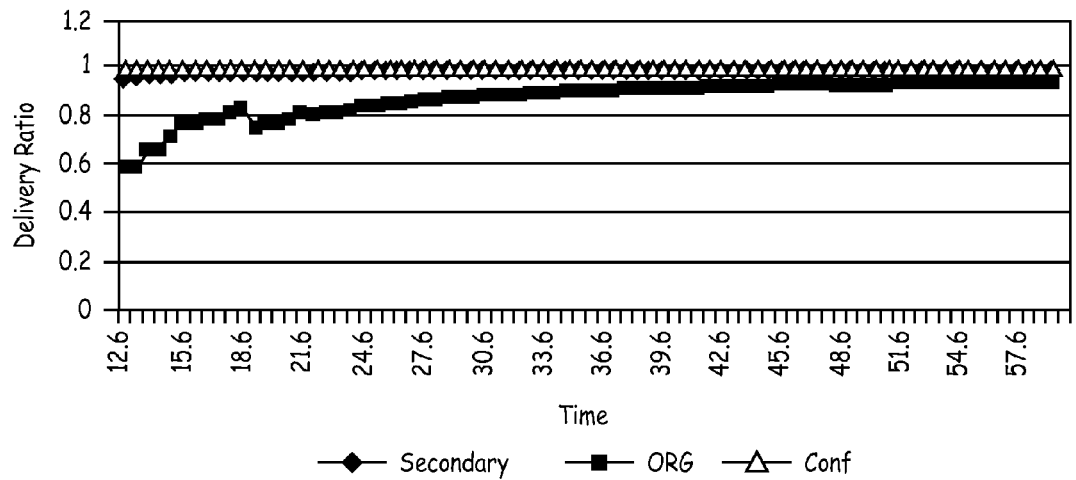
FIGS. 6-8 are graphs showing the results of a simulation analysis with respect to delivery ratio, packet drop probability, and forwarding overhead.
Figure 7:
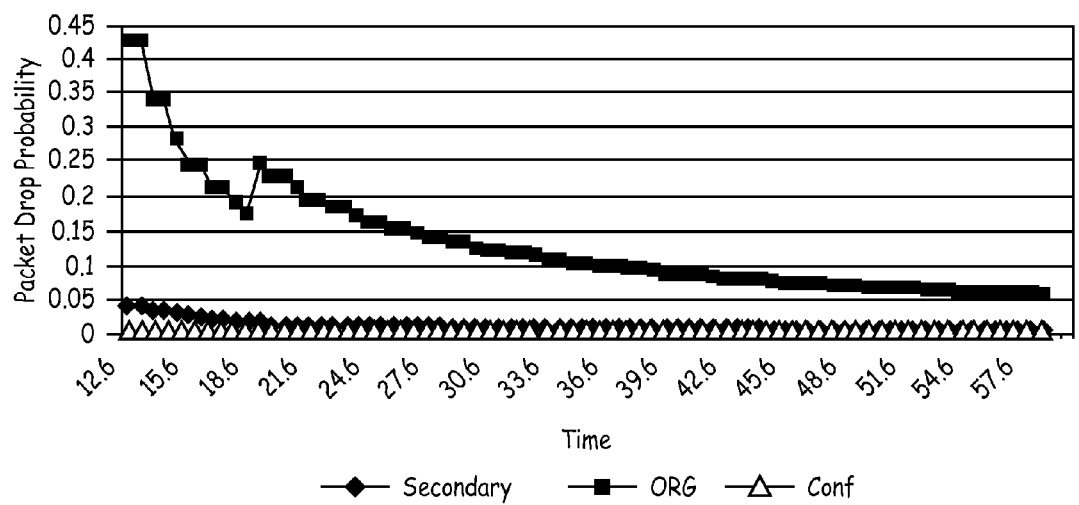
Figure 8:
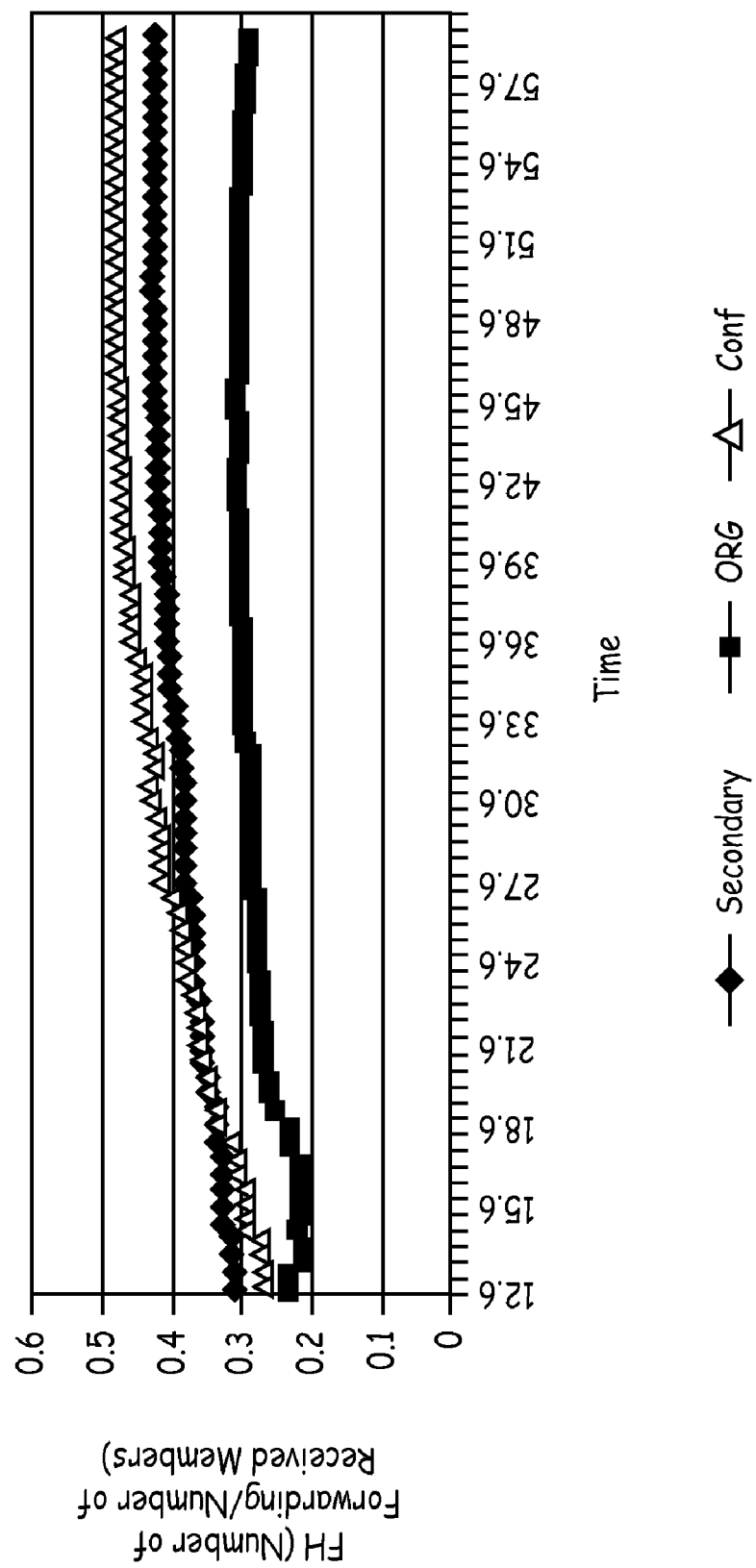

FIGS. 6-8 are graphs showing the results of the simulation with respect to delivery ratio, packet drop probability, and forwarding overhead (FH). In FIGS. 6-8, "Secondary" refers to the secondary MPR set calculation incorporated with SMF, "ORG" refers to the original SMF protocol, and "Conf" refers to the configuration-aware MPR selection integrated with SMF.

As shown in FIG. 6, the redundant MPR selection techniques (Secondary and Conf) significantly improve the delivery ratio. In most cases, the redundant MPR selection techniques succeed in delivering the packets to all members in the network, as depicted in FIGS. 6 and 7. Since the redundant MPR selection techniques improve the delivery ratio, the effective forwarding overhead increase compared to the original SMF is not significant (see FIG. 8). Notably, the forwarding overhead by the secondary MPR set calculation technique is slightly lower than that by the configuration-aware MPR selection technique. This occurs since the secondary MPR set calculation technique minimizes the number of secondary MPRs that cover the primary MPR nodes, whereas the configuration-aware MPR selection technique chooses the same number of secondary MPRs to that of primary MPRs.

Instructions for carrying out the various process tasks, calculations, and generation of signals and other data used in the operation of the method of the invention can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs), or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, and the like, which perform particular tasks or implement particular abstract data types. These represent examples of means for executing steps of the methods disclosed herein. The particular sequence of such executable instructions or associated data structures represent examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for enhancing the reliability of a multicasting forwarding protocol in a wireless network, the method comprising:
    establishing a list of multi-point relaying nodes for each of a plurality of nodes in the wireless network, the list of multi-point relaying nodes including neighbor nodes that cover each of the plurality of nodes within two hops;
    identifying a first set of nodes in the wireless network that is not already in the list of multi-point relaying nodes, wherein the first set of nodes comprises:
        nodes that are the only neighbor node to a node in the list of multi-point relaying nodes; or
        nodes that are sequentially previous to a node in the list of multi-point relaying nodes; and
    adding the first set of nodes to the list of multi-point relaying nodes.

2. The method of claim 1, wherein when the first set of nodes comprises nodes that are the only neighbor node to a node in the list of multi-point relaying nodes, the method further comprises:
    identifying a second set of nodes in the wireless network that is not already in the list of multi-point relaying nodes, the second set of nodes comprising nodes that are neighbors to the most number of nodes in the list of multi-point relaying nodes; and
    adding the second set of nodes to the list of multi-point relaying nodes.

3. The method of claim 1, wherein the wireless network comprises a mobile ad-hoc network.

4. The method of claim 3, wherein the mobile ad-hoc network includes a first vehicle and at least one other vehicle.

5. The method of claim 1, wherein the wireless network comprises a mobile ad-hoc network including a plurality of vehicles deployed in a convoy.

6. The method of claim 5, wherein the plurality of nodes comprises wireless hubs integrated into the vehicles.

7. A non-transitory computer readable medium having instructions executable by a processor for performing the method of claim 1.

8. The method of claim 1, wherein the nodes are placed in a string-like configuration.

9. A method for enhancing the reliability of a multicasting forwarding protocol in a wireless network, the method comprising:
    providing a plurality of nodes for the wireless network, the nodes placed in a string-like configuration;
    establishing a list of multi-point relaying nodes for each of the plurality of nodes, the list of multi-point relaying nodes including neighbor nodes that cover each of the plurality of nodes within two hops;
    identifying a first set of nodes in the wireless network that is not already in the list of multi-point relaying nodes, the first set of nodes comprising nodes that are the only neighbor node to a node in the list of multi-point relaying nodes;
    adding the first set of nodes to the list of multi-point relaying nodes;
    identifying a second set of nodes in the wireless network that is not already in the list of multi-point relaying nodes, the second set of nodes comprising nodes that are neighbors to the most number of nodes in the list of multi-point relaying nodes; and
    adding the second set of nodes to the list of multi-point relaying nodes.

10. The method of claim 9, wherein the wireless network comprises a mobile ad-hoc network.

11. The method of claim 10, wherein the mobile ad-hoc network includes a first vehicle and at least one other vehicle.

12. The method of claim 9, wherein the wireless network comprises a mobile ad-hoc network including a plurality of vehicles deployed in a convoy.

13. The method of claim 12, wherein the plurality of nodes comprises wireless hubs integrated into the vehicles.

14. A non-transitory computer readable medium having instructions executable by a processor for performing the method of claim 9.

15. A wireless network, comprising:
a plurality of nodes;
at least one processor in each of the plurality of nodes, the processor configured to execute instructions stored on a computer readable medium to perform a method comprising:
establishing a list of multi-point relaying nodes for each of the plurality of nodes in the wireless network, the list of multi-point relaying nodes including neighbor nodes that cover each of the plurality of nodes within two hops;
identifying a first set of nodes in the wireless network that is not already in the list of multi-point relaying nodes, wherein the first set of nodes comprises:
nodes that are the only neighbor node to a node in the list of multi-point relaying nodes; or
nodes that are sequentially previous to a node in the list of multi-point relaying nodes; and
adding the first set of nodes to the list of multi-point relaying nodes.

16. The network of claim 15, wherein the wireless network comprises a mobile ad-hoc network.

17. The network of claim 16, wherein the mobile ad-hoc network includes a first vehicle and at least one other vehicle.

18. The network of claim 15, wherein the wireless network comprises a mobile ad-hoc network including a plurality of vehicles deployed in a convoy.

19. The network of claim 18, wherein the plurality of nodes comprises wireless hubs integrated into the vehicles.

20. The network of claim 15, wherein when the first set of nodes comprises nodes that are the only neighbor node to a node in the list of multi-point relaying nodes, the method further comprises:
identifying a second set of nodes in the wireless network that is not already in the list of multi-point relaying nodes, the second set of nodes comprising nodes that are neighbors to the most number of nodes in the list of multi-point relaying nodes; and
adding the second set of nodes to the list of multi-point relaying nodes.

* * * * *